US009360570B2

(12) United States Patent
Rothfuss et al.

(10) Patent No.: US 9,360,570 B2
(45) Date of Patent: Jun. 7, 2016

(54) METHOD AND APPARATUS FOR AUTOMATIC CALIBRATION CHECK OF PET SCANNER USING INTRINSIC BACKGROUND RADIATION OF SCINTILLATOR CRYSTALS

(71) Applicant: Siemens Medical Solutions USA, Inc., Malvern, PA (US)

(72) Inventors: Harold E. Rothfuss, Knoxville, TN (US); Andrew Philip Moor, Knoxville, TN (US); John W. Young, Knoxville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 0 days.

(21) Appl. No.: 14/665,033

(22) Filed: Mar. 23, 2015

(65) Prior Publication Data

US 2015/0301201 A1 Oct. 22, 2015

Related U.S. Application Data

(60) Provisional application No. 61/981,363, filed on Apr. 18, 2014.

(51) Int. Cl.
*G01T 1/29* (2006.01)
*G01T 1/164* (2006.01)
*G01T 1/40* (2006.01)

(52) U.S. Cl.
CPC ............. *G01T 1/2985* (2013.01); *G01T 1/1647* (2013.01); *G01T 1/40* (2013.01)

(58) Field of Classification Search
CPC .................................................... G01T 1/2985
See application file for complete search history.

(56) References Cited

U.S. PATENT DOCUMENTS

| 5,023,449 | A | * | 6/1991 | Holenka et al. ............. 250/252.1 |
| 5,384,699 | A | * | 1/1995 | Levy et al. ................ 250/363.03 |
| 5,677,536 | A | * | 10/1997 | Vickers .................... 250/363.09 |
| 7,633,057 | B2 | | 12/2009 | Cooke et al. |
| 2014/0217294 | A1 | * | 8/2014 | Rothfuss et al. .............. 250/362 |

OTHER PUBLICATIONS

C. Knoess et al., "Development of a Daily Quality Check Procedure for the High-Resolution Research Tomograph (HRRT) Using Natural LSO Background Radioactivity", IEEE TNS 49, 5, 2074-2078, 2002.
M. Conti et al., "Monitoring energy calibration drift using the scintillator background radiation", IEEE TNS 58, 3, 687-694, 2011.
H. Rothfuss et al., "Time Alignment of Time of Flight Positron Emission Tomography using the Background Activity of LSO", IEEE NSS-MIC Conference Record, 2013.
H. Rothfuss et al., "LSO Background Radiation as a Transmission Source Using Time of Flight Information", IEEE NSS-MIC Conference Record, 2013.

* cited by examiner

*Primary Examiner* — David Porta
*Assistant Examiner* — Hugh H Maupin
(74) *Attorney, Agent, or Firm* — Peter Kendall

(57) ABSTRACT

Gain values of PMTs of a PET scanner's detectors are balanced based on detected radiation from a radioactive calibration source placed in an FOV of the scanner. A time alignment is performed for scintillator crystals of the detectors based on TOF computations based on gamma photons associated with the radioactive calibration source. Baseline data is acquired using intrinsic background radiation of the scintillator crystals, without any object in the FOV. A first set of data, based on the baseline data, is stored in a memory of the scanner. After the acquisition of the baseline data, test data is acquired using intrinsic background radiation of the scintillator crystals, without any object in the FOV. A calibration status of the scanner or of an environment surrounding the scanner is automatically checked based on a comparison between the stored first set of data and a second set of data.

22 Claims, 10 Drawing Sheets

METHOD AND APPARATUS FOR AUTOMATIC CALIBRATION CHECK OF PET SCANNER USING INTRINSIC BACKGROUND RADIATION OF SCINTILLATOR CRYSTALS

CROSS-REFERENCE TO RELATED APPLICATION

This application claims priority under 35 U.S.C. §119(e) from U.S. Provisional Application Ser. No. 61/981,363 filed Apr. 18, 2014, the entirety of which is hereby incorporated by reference herein.

FIELD

Aspects of the present disclosure relate in general to nuclear medicine, and systems for obtaining nuclear medicine images, and more particularly to techniques for operating a positron emission tomography (PET) scanner to check calibration status efficiently using intrinsic background radiation from scintillator crystals.

BACKGROUND

Nuclear medical imaging has gained popularity in recent decades, and medical imaging techniques such as positron emission tomography (PET) scans have been an effective visualization tool in a variety of contexts. For PET, a positron-emitting radionuclide (tracer) comprising a radioactive isotope is typically introduced into the body of a patient. As the radioisotope undergoes beta decay, it emits a positron, which soon interacts with a nearby electron in an annihilation event that produces two gamma photons traveling in opposite directions. The gamma photons may also be referred to as gamma rays or γ-rays. A scintillator or scintillation crystal in a PET scanner typically detects one of the gamma photons originating from the annihilation event, and another scintillator crystal detects the other gamma photon. The scintillator crystals are typically part of detectors that are arranged in a circular or cylindrical configuration around the region where the patient lies. When struck with a gamma photon, each scintillator crystal emits a flash of visible light that is converted to electrons by a photomultiplier tube (PMT) of the PET scanner for subsequent electrical processing.

Based on energy windows that are defined for expected energies of incident gamma photons and based on a check for two coincidental detections at respective scintillators, information about the annihilation event and particularly its location can be stored and processed. In particular, when two gamma photons are captured at respective scintillators, the positron that was annihilated to yield the gamma photons is assumed to have originated somewhere along a line of response (LOR) between the two scintillator crystals. Based on timing information, e.g., respective times of detection at the scintillator crystals corresponding to each detected gamma photon can be used to determine the position of the annihilation event along the line between the scintillator crystals. Because the annihilation event typically occurs very close (e.g., 1 mm) to the site of positron emission from the radioisotope, the location of the tracer that led to the annihilation event can be determined. An image such as a 3D PET image can be computed based on many such gamma photon detections.

Calibration of a PET scanner is an important consideration, as the effectiveness of PET imaging depends in large part on consistency of the images. A PET scanner is a physical system that comprises many pieces of equipment that can go out of calibration over time, e.g., due to drift in gain of PMTs or other causes. Conventionally, calibration of PET scanners is accomplished by a setup procedure that relies on a controlled radioactive source of known, carefully precalibrated radioactivity that decays with a known time constant. Such a radioactive source is typically referred to as a hot phantom. By placing the hot phantom in a controlled, repeatable configuration (e.g., at the center of a gantry of the PET scanner) and measuring gamma detection counts arising from the known radioactivity of the hot phantom, components of the PET scanner can be calibrated. However, such a calibration procedure that relies on an external positron source (phantom) is typically time consuming, as the phantom must be maintained and carefully placed in the center of the gantry. Additionally, calibration that requires a human to handle the phantom repeatedly is associated with health and safety concerns because the phantom is a source of radioactivity.

SUMMARY

In some embodiments of the present disclosure, gain values of photomultiplier tubes of one or more detectors of a PET scanner are balanced based on detected radiation from a radioactive calibration source placed in a field of view of the PET scanner. A time alignment is performed for a plurality of scintillator crystals of the detectors based on time-of-flight (TOF) computations based on gamma photons associated with the radioactive calibration source. Baseline data is acquired using intrinsic background radiation of the scintillator crystals, without any object in the field of view. A first set of data, based on the baseline data, is stored in a memory of the PET scanner. After the acquisition of the baseline data, test data is acquired using intrinsic background radiation of the plurality of scintillator crystals, without any object in the field of view. A calibration status of the PET scanner or of an environment surrounding the PET scanner is automatically checked based on a comparison between the stored first set of data and a second set of data that is based on the test data.

In some embodiments, a PET scanner system includes detectors comprising multiple lutetium-based scintillator crystals. The PET scanner system also includes a machine-readable storage medium and a system controller connected to and in communication with the detectors. The machine-readable storage medium is encoded with a computer program code such that, when the computer program code is executed by the system controller, the system controller performs various operations. Gain values of photomultiplier tubes of one or more detectors are balanced based on detected radiation from a radioactive calibration source placed in a field of view of the PET scanner. A time alignment is performed for a plurality of scintillator crystals of the detectors based on time-of-flight (TOF) computations based on gamma photons associated with the radioactive calibration source. Baseline data is acquired using intrinsic background radiation of the scintillator crystals, without any object in the field of view. A first set of data, based on the baseline data, is stored in a memory of the PET scanner. After the acquisition of the baseline data, test data is acquired using intrinsic background radiation of the plurality of scintillator crystals, without any object in the field of view. A calibration status of the PET scanner or of an environment surrounding the PET scanner is automatically checked based on a comparison between the stored first set of data and a second set of data that is based on the test data.

In some embodiments, a machine-readable storage medium tangibly embodies a program of instructions executable by a processor to cause the processor to perform various operations. Gain values of photomultiplier tubes of one or more detectors are balanced based on detected radiation from a radioactive calibration source placed in a field of view of the PET scanner. A time alignment is performed for a plurality of scintillator crystals of the detectors based on time-of-flight (TOF) computations based on gamma photons associated with the radioactive calibration source. Baseline data is acquired using intrinsic background radiation of the scintillator crystals, without any object in the field of view. A first set of data, based on the baseline data, is stored in a memory of the PET scanner. After the acquisition of the baseline data, test data is acquired using intrinsic background radiation of the plurality of scintillator crystals, without any object in the field of view. A calibration status of the PET scanner or of an environment surrounding the PET scanner is automatically checked based on a comparison between the stored first set of data and a second set of data that is based on the test data.

BRIEF DESCRIPTION OF THE DRAWINGS

The following will be apparent from elements of the figures, which are provided for illustrative purposes and are not necessarily to scale.

DETAILED DESCRIPTION

This description of the exemplary embodiments is intended to be read in connection with the accompanying drawings, which are to be considered part of the entire written description.

In various embodiments of the present disclosure, improved techniques for calibrating a PET scanner address various shortcomings of conventional techniques. By making use of intrinsic background radiation arising from scintillator crystals due to the presence of a radioactive material within the crystals, calibration status can be checked automatically and efficiently, obviating the need for repetitive handling of a hot phantom.

Figure 1:
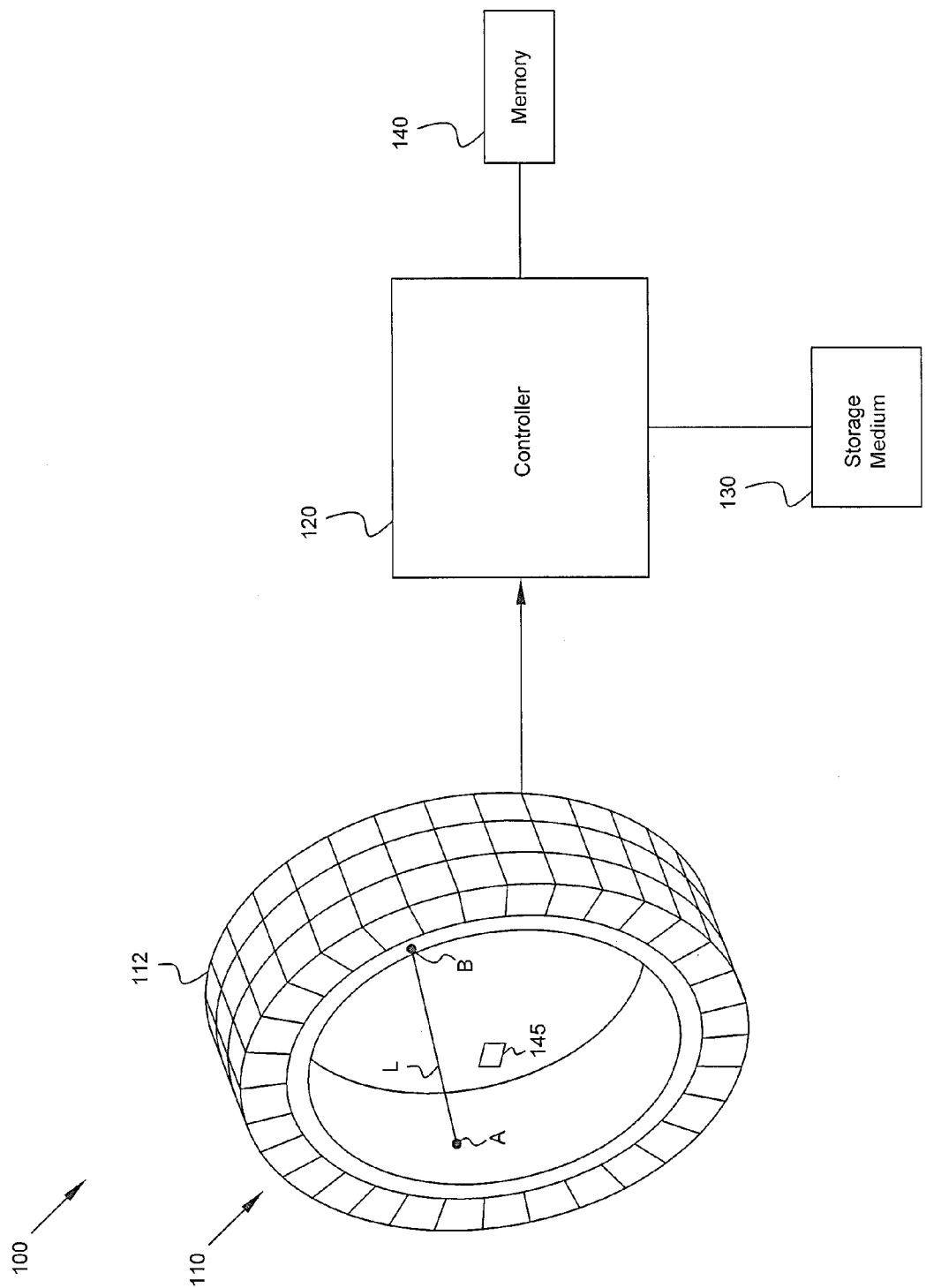
FIG. 1 is a an illustration of a PET system in accordance with some embodiments of the present disclosure.

FIG. 1 is an illustration of a PET system in accordance with some embodiments. A PET scanner system 100 includes a gantry 110 having a plurality of detectors 112 comprising scintillator crystals. As just one example, the scintillator crystals may be lutetium-based scintillator crystals each measuring about 4×4×20 mm in some embodiments, e.g., scintillator crystals including lutetium orthosilicate (LSO) or lutetium yttrium orthosilicate (LYSO), that include the radioactive isotope Lu-176. In one example configuration, the scintillator crystals may be arranged in an array of 13×13 crystals to form what is referred to as a detector block, a group of 4×4 blocks may be referred to as a detector electronics assembly (DEA), and scanner 100 may include an array of 12 DEAs.

In the case of gamma photons emitted as a result of annihilation events based on a positron emitted by a radiotracer in a patient's body or by a hot phantom placed in the center of gantry 110 for calibration purposes, some of the emitted gamma photons arising from annihilation events may travel along a line of response (LOR) that intersects a pair of scintillator crystals, and coincidental strikes can be detected and processed.

In the case of intrinsic background radiation of lutetium-based scintillator crystals, when Lu-176 present in naturally occurring lutetium decays, one beta ($\beta$) particle and three gamma photons are emitted in coincidence. The cascade gamma emissions have energies of 88, 202, and 307 keV. Consider the case of intrinsic background radiation from a scintillator crystal A shown in FIG. 1. A beta particle is emitted at this scintillator crystal, and this beta emission, which has a known energy, may be detected based on a suitably defined energy window. If a gamma photon emitted in coincidence with the beta traverses the linear path L and strikes another scintillator crystal B, that strike can similarly be detected based on a suitably defined energy window. Typically, 202 and 307 keV gamma photons can be detected in this manner but 88 keV gamma photons are generally too low in energy to be detected. Based on timing information regarding coincidental or nearly coincidental detections, the emissions detected at scintillator crystals A and B can be correlated to the same Lu-176 beta decay.

Figure 7:
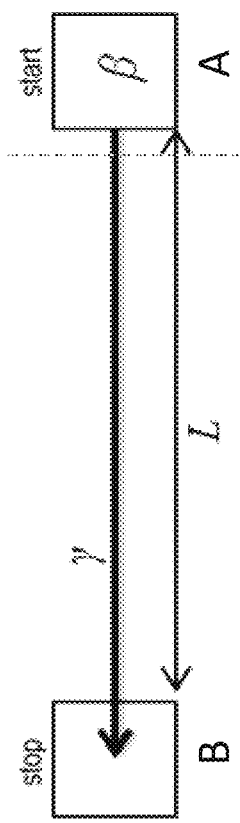
FIG. 7 is an illustration of a TOF computation approach in accordance with some embodiments.

Thus, the beta emission detected at scintillator crystal A can considered to be a start signal, and the gamma photon detected at scintillator crystal B can be considered to be a stop signal, as shown in FIG. 7. Based on the known fixed PET scanner geometry, which is assumed to be unchanged over the lifetime of the scanner, and the start and stop signals, time of flight (TOF) computations can be performed. For example, the distance between each pair of scintillator crystals in the PET scanner 100 is known, the speed of a gamma photon emitted by decay of Lu-176 is known, and the expected time for traversing path L can be calculated based on the distance and speed. The expected time of flight (TOF) can be compared with the measured TOF (i.e., the time duration between the start signal and the stop signal), and the difference between these two quantities should be zero or nearly zero (e.g., within one time resolution bin, e.g., 39 ps) in the case of a properly time-calibrated system.

PET scanner system 100 further includes a system controller or processor 120 connected to and in communication with the detectors 112, and a tangible machine readable storage medium 130 that is encoded with a computer program code which, when executed by system controller 120, causes the controller to perform various operational functions of PET scanner system 100 discussed below. PET scanner system 100 includes a memory 140. Storage medium 130 may be part of memory 140 or may be separate from memory 140.

Figure 2:
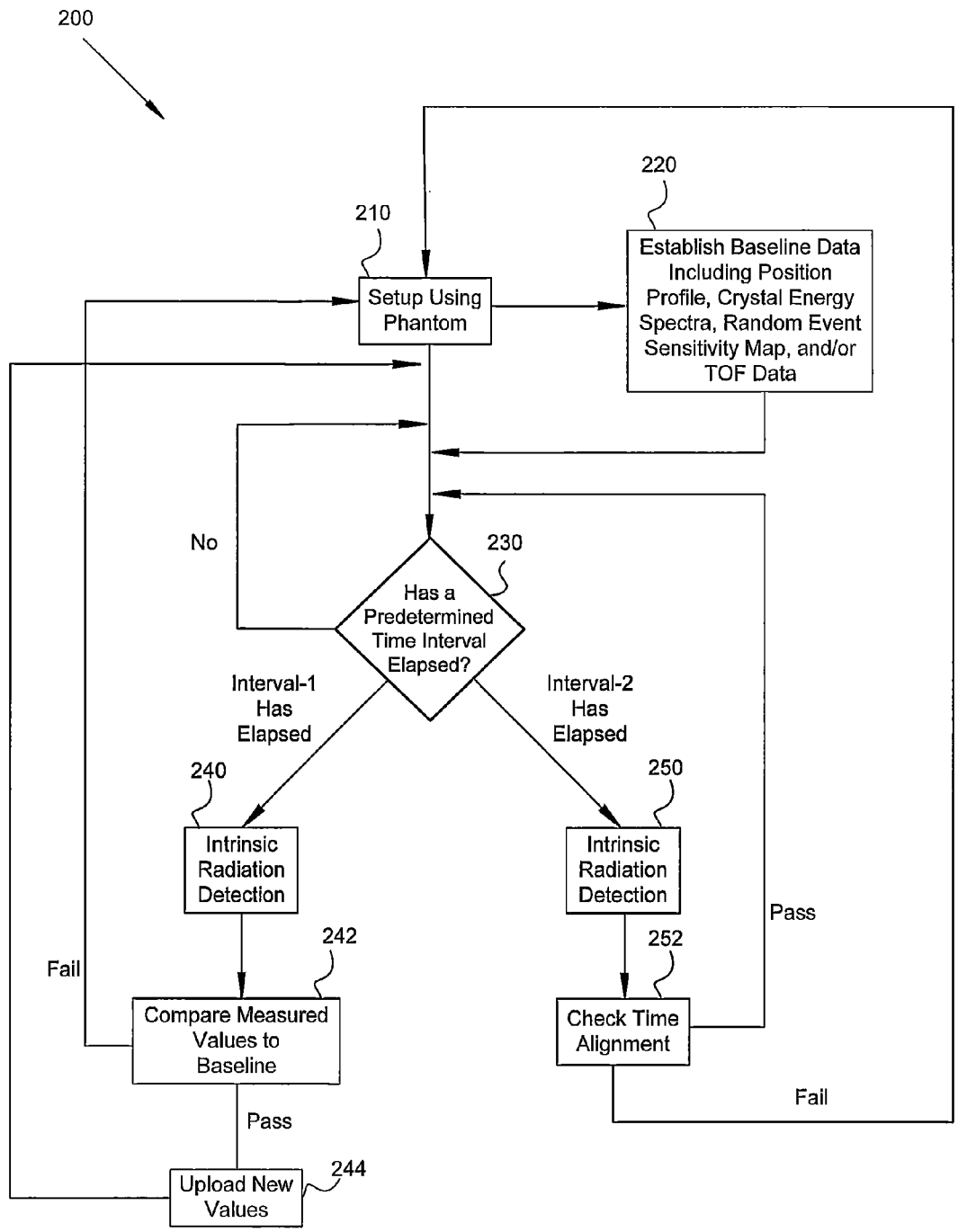
FIG. 2 is a flow diagram of a process in accordance with some embodiments.
Figure 3:
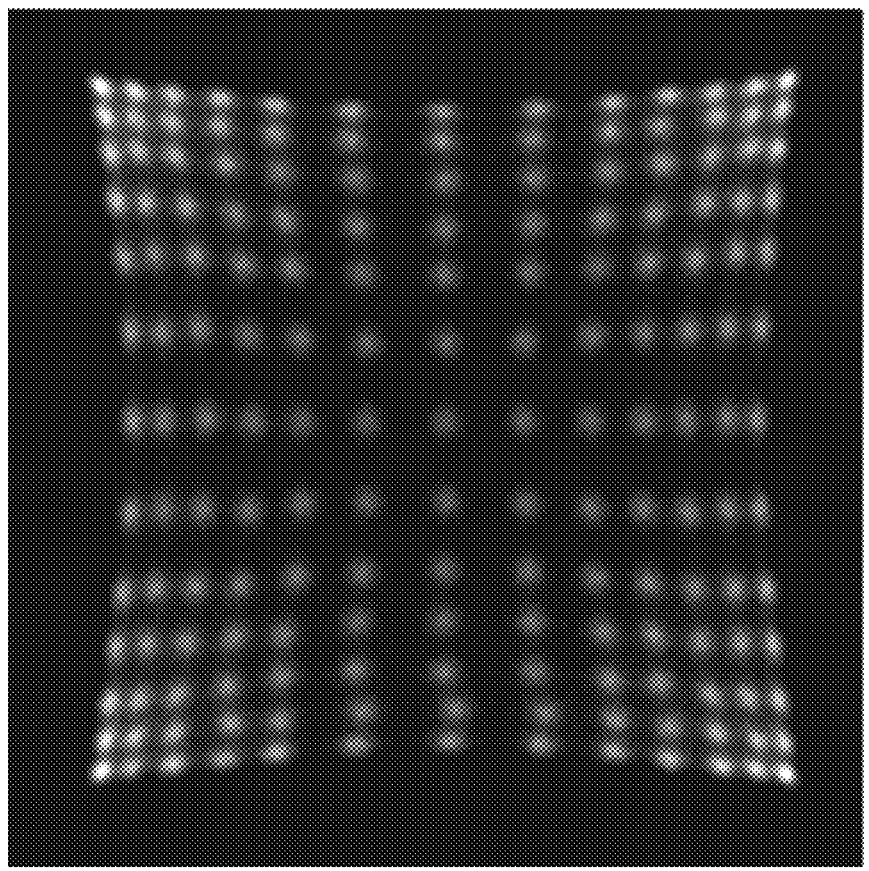
FIG. 3 is an example position profile in accordance with some embodiments.

FIG. 2 is a flow diagram of a process 200 in accordance with some embodiments. At block 210, a full setup (calibration) is performed using detected radiation from a radioactive calibration source (phantom) 145 (see FIG. 1) placed in a field of view (FOV) of PET scanner 100, e.g., at a center of gantry 110. The full setup may include balancing photomultiplier (PMT) gain values, which involves setting the gains to correspond to a known signal output level. In one example configuration, four PMTs are associated with each detector block comprising 13×13 scintillator crystals. A conventional gain balancing technique can be used at block 210, e.g., an iterative procedure that begins with the gains for the respective PMTs set low and then iteratively increasing the gains until photopeaks for the respective scintillator crystals reach a desired value. A position profile may also be determined for each detector block based on the radiation from the phantom. An example position profile is shown in FIG. 3. The position profile is substantially square when the PMT gains are properly balanced, and one PMT may correspond to each corner of the square.

The full setup based on the phantom may also include determining the 511 keV photopeak for each detector and performing a system time alignment, based on TOF data from a pair of coincidental gamma photons detected at respective scintillator crystals. The signal path propagation delay from the detector through the electronics varies slightly for each scintillator crystal. The variations may be due to differences in LSO light, crystal surface finish, PMT transient time, cable length differences, amplifier propagation delay times, or other factors. To compensate for the differences in propagation delay times, the event time (time of detection event) may be modified by adding (or subtracting) a time correction value, also known as a time alignment value. The time alignment that may be performed as part of the full setup using the phantom can provide the time correction values, which can be stored in memory 140.

Figure 4:
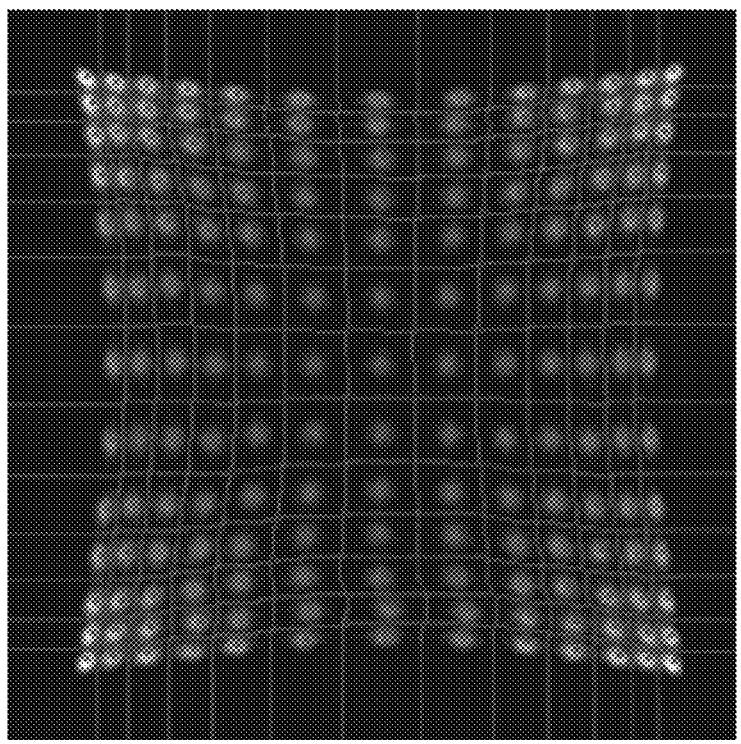
FIG. 4 is an example crystal region map in accordance with some embodiments.
Figure 5:
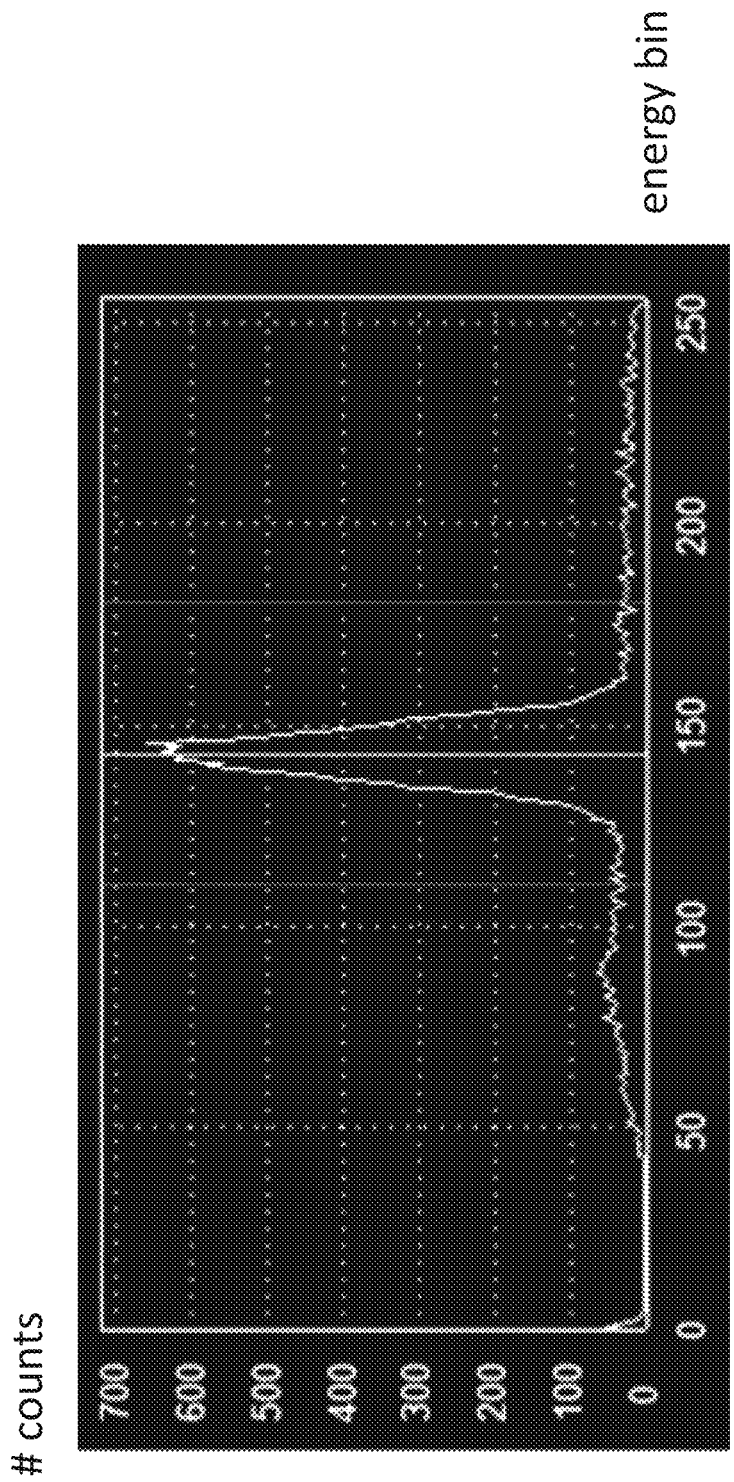
FIG. 5 is an example crystal energy spectrum in accordance with some embodiments.

At block 220, after the full setup procedure using the phantom has been completed, baseline data are acquired using intrinsic background radiation of the scintillator crystals, without any object in the field of view. The baseline data can later serve as a baseline for comparison with later-acquired data in order to check if PET scanner 100 is still in calibration. Based on the baseline data, a first set of data may be stored in memory 140. The first set of data may include data related to a baseline position profile; baseline crystal energy spectrum, baseline random event sensitivity map, and/or baseline TOF-based alignment data. The baseline position profile may be a position profile similar to the one shown in FIG. 3. A crystal region map such as shown in FIG. 4 may be generated to determine the peak locations, e.g., using a Voronoi tessellation. The baseline crystal energy spectrum, an example of which is shown in FIG. 5, may be similar may include counts vs. energy bin (or energy) information one or more scintillator crystals, or may include a subset of that information such as just the location and/or counts for each energy peak. The baseline random event sensitivity map, which may be similar to the one shown in FIG. 6A, corresponds to random events arising from the Lu-176 intrinsic background radiation of scintillator crystals. The baseline TOF-based alignment data may include time correction values obtained from expected TOF and measured TOF data.

Whereas conventionally PET scanner calibration has only been performed using a phantom in the context of the full setup of block 210, in various embodiments an automatic loop-based calibration check can be performed without a phantom. In some embodiments, at block 230, a check is performed to determine whether a predetermined time interval has elapsed, e.g., since block 220 or block 244 or block 252. If the predetermined time interval has not elapsed yet (the "NO" branch from block 230), then the process flow waits until the predetermined time interval has elapsed. In the example process flow of FIG. 2, two separate time intervals are shown as triggers for respective processing paths, although a single time interval can be used in other examples. Time interval-1 may be a daily time interval, such that block 240 is performed daily. At block 240, intrinsic background radiation of Lu-176 is detected. Block 250 is similar to block 240 except block 250 is performed after time interval-2, e.g., weekly.

The acquisition of data using intrinsic background radiation at blocks 240 and 250 may be referred to as acquisition of test data. At both blocks 242 and 252, a second set of data, which may be based on the test data, is compared against the stored first set of data, which is retrieved from memory 140. For example, at block 242, various measured values related to a position profile, crystal energy spectrum, and/or a random event sensitivity map may be compared against a previously determined baseline, in order to determine if PET scanner system 100 is still in a calibrated state.

If the comparison at block 242 reveals that the system is no longer calibrated, another full setup using the phantom is initiated (block 210); otherwise, new values are uploaded to memory 140 at block 244, and the process flow proceeds to another iteration of the loop as shown in FIG. 4.

At block 252, system time alignment is checked using TOF computations, e.g., by determining the expected TOF and computing a difference between expected TOF and measured TOF. In some embodiments, the expected TOF is calculated by accessing a look-up table in memory 140, wherein the look-up table is indexed by a pair of scintillator crystals. For example, the look-up table may store distance or gamma photon traversal time between each pair of scintillator crystals. If the time alignment check fails, e.g., because the computed time difference is greater in magnitude than a predetermined threshold, another full setup using the phantom is initiated (block 210); otherwise, the process flow proceeds to another iteration of the loop as shown in FIG. 4.

Figure 10:
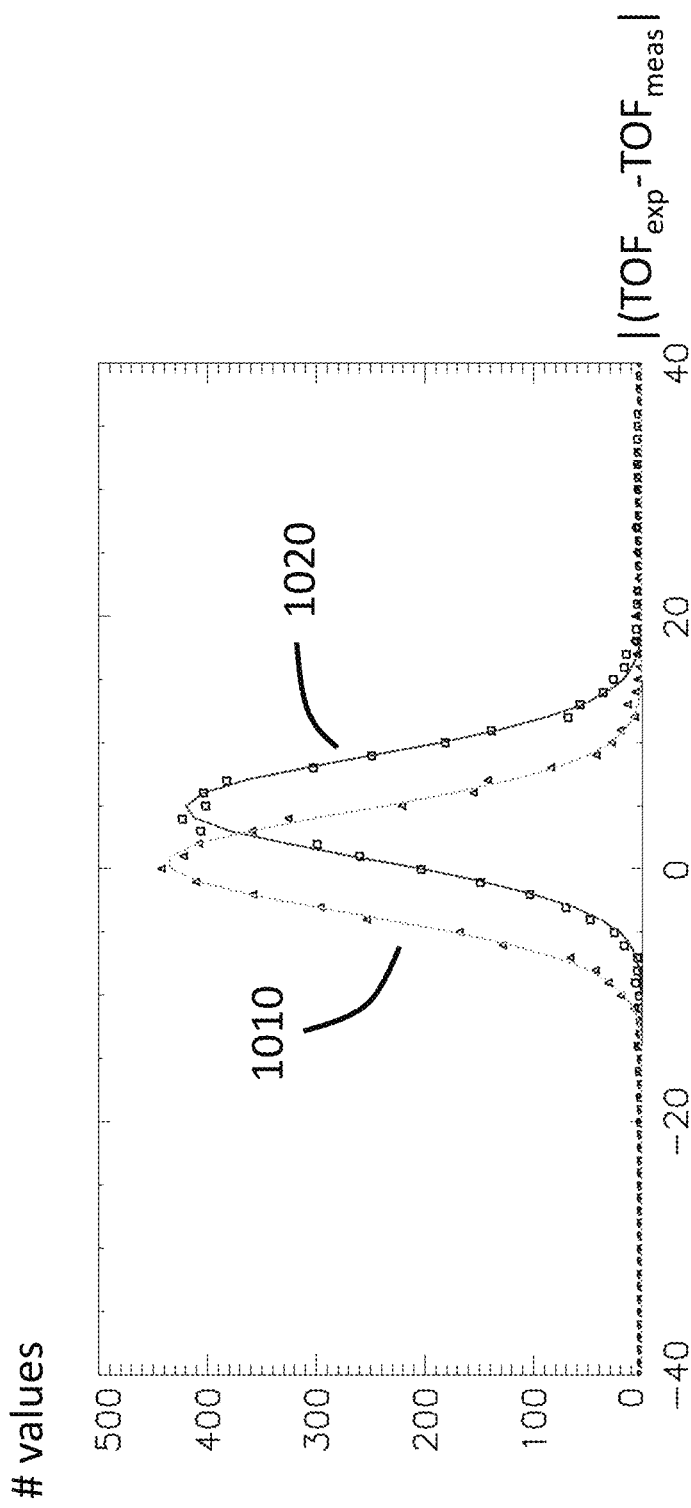
FIG. 10 is a plot of histograms of time differences between expected and measured TOFs in accordance with some embodiments.

In some embodiments, the TOF alignment check based on intrinsic background radiation of Lu-176 includes identifying start and stop scintillator crystals repeatedly over a time interval for a plurality of decays. The expected TOF is calculated, and the TOF is measured, for each detected gamma photon. A time difference between expected TOF and measured TOF is computed for each detected gamma photon, to yield a plurality of time differences, from which a histogram may be generated as shown in FIG. 10. FIG. 10 shows a histogram 1010 corresponding to a time-aligned state and another histogram 1020 corresponding to when time alignment values are incorrect. Histogram 1010 may be generated at block 220, and the centroid of that histogram (approximately 0 in this example) may be stored as part of the first data. Histogram 1020 which is subsequently generated can be used to compute a centroid which compared against the previously stored centroid, to determine whether the centroid has shifted enough to satisfy a predetermined time misalignment condition, which may correspond to a shift greater than a predetermined magnitude. If the predetermined time misalignment condition is satisfied, an error status may be signaled.

Figure 8:
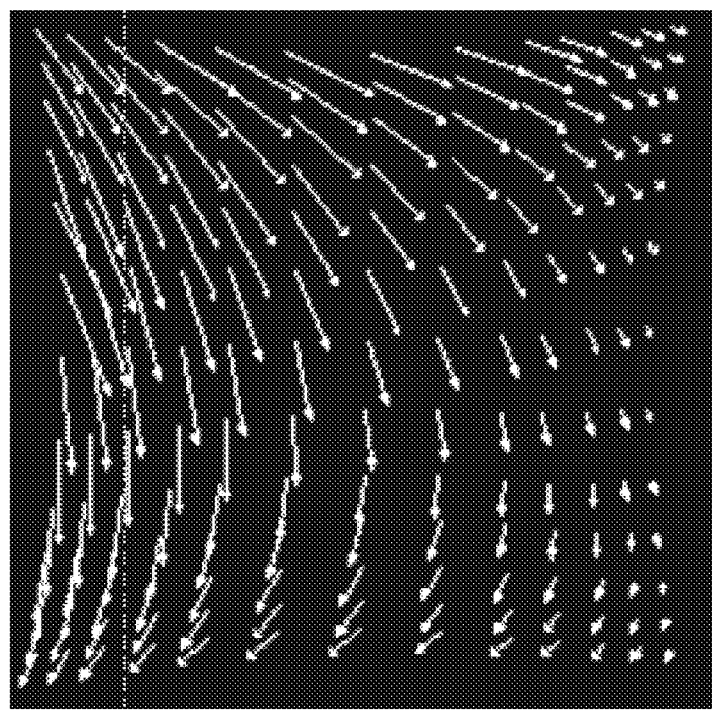
FIG. 8 is an example vector field in accordance with some embodiments.

In one example, a position profile for a subset of the scintillator crystals, e.g., a 13×13 matrix of crystals, is generated based on the test data, and peak detection is performed based on the generated position profile. If there are fewer than a predetermined number N of peaks detected, an error status may be signaled, where N is the number (169 in the example above) of scintillator crystals in the subset of scintillator crystals. The first set of data are retrieved from memory 140. The locations of respective peaks determined from the generated position profile may be compared with previously stored values from the retrieved first set of data. A predetermined drift condition may be evaluated at block 242 to reveal the miscalibration state. For example, in some embodiments, a vector field is computed from the previous and current peak positions, as shown in FIG. 8, and the predetermined drift condition may be that a sum based on Euclidean norm (or another norm) for each peak position pair in the vector field exceeds a predetermined threshold. One of ordinary skill recognizes that drift in peak locations may be determined in other ways as well. If the predetermined drift condition has not been satisfied, the new peak locations are stored in memory for block 244 in this example.

In some embodiments, gain values of PMTs are balanced based on locations of detected peaks in a generated position profile. This gain balancing may be a refinement or "tweak" that complements rather than replaces the full gain balancing performed at block 210 using the phantom.

Figure 9:
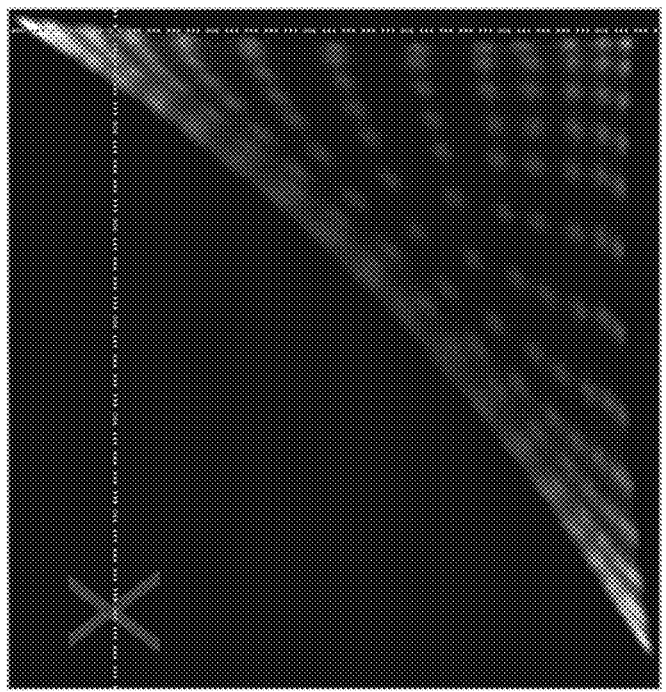
FIG. 9 is an example position profile in the case of a failed PMT in accordance with some embodiments.

In some embodiments, failed PMT is identified based on the generated position profile. For example, if the position profile is substantially triangular as in FIG. 9, it can be inferred that the PMT at the location marked by "X" is a failed PMT, because events have not been pulled to the PMT at the top left corner of the square in FIG. 8. If two PMTs for a detector block have failed, the generated profile will be a degenerate line at the edge of the square opposite the two failed PMTs, although the circumstance of two failed PMTs is expected to be relatively rare if calibration per various embodiments of the present disclosure is utilized (because corrective measures will likely be taken once one failed PMT is identified).

Thus, by exploiting the intrinsic background radiation of Lu-176 in scintillator crystals, calibration checks can be performed in an automated manner without human involvement because a hot phantom does not need to be handled. The detection corresponding to blocks 240 and 250 can be scheduled to occur at minimally disruptive times, e.g., based on system load scheduling. Although examples of daily and weekly checks are described above, any time interval(s) can be used. The tradeoff is that more frequent calibration checks based on intrinsic background radiation will yield faster identification of an out-of-calibration state at the expense of increased resources devoted to such calibration checks.

In another example, based on the test data, an energy spectrum is generated for each scintillator crystal. The first set of data which is retrieved from memory 140 includes photopeak data for the scintillator crystals based on the baseline data. A photopeak is detected in the generated energy spectrum for each scintillator crystal. At block 242, a detected photopeak is compared with a corresponding photopeak in the retrieved first set of data, to determine whether the detected photopeak has drifted sufficiently to satisfy a predetermined drift condition. The predetermined drift condition may be a deviation (drift) from the corresponding stored photopeak that exceeds a predetermined threshold. If the predetermined drift condition has not been satisfied, the new photopeak is stored in memory for block 244 in this example.

Figure 6A:
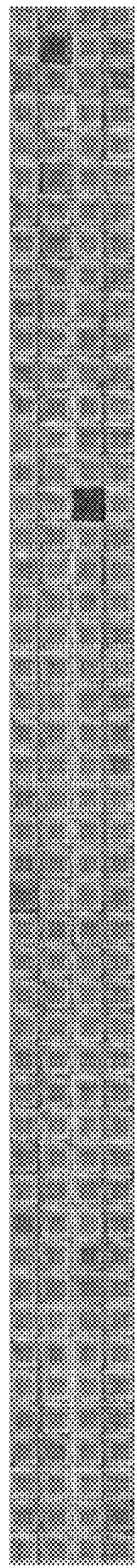
FIG. 6A is an example random event sensitivity map when there are not any external radiation sources outside the field of view.
Figure 6B:
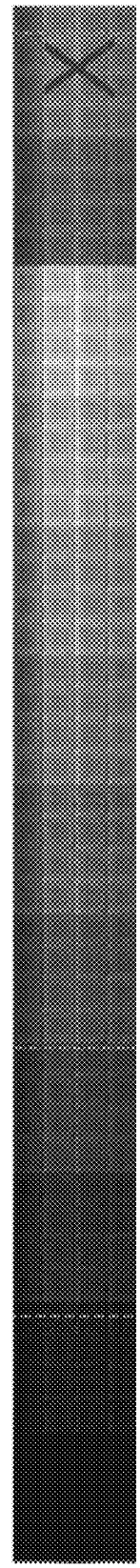
FIG. 6B is an example random event sensitivity map when there is an external radiation source outside the field of view.

In another example, a random event sensitivity map is generated based on random detection events from the test data. The random sensitivity map may be generated by computing a histogram of time uncorrelated background events. Based on the random event sensitivity map, the presence of an external radiation source outside the field of view of PET scanner 100 can be discerned. For example, an external radiation source can be detected with the random event sensitivity map of FIG. 6B. The external radiation source can be detected by comparing the generated random event sensitivity map (e.g., as shown in FIG. 6B) with a previously stored baseline random event sensitivity map (e.g., as shown in FIG. 6A) that was formed based on baseline data, and by applying a threshold to the comparison result. One of ordinary skill in the art recognizes that the comparison and application of a threshold can be implemented in many ways, e.g., comparison on a per-pixel, per-block, or per-DEA basis, and using a threshold that is based on a relative difference (e.g., percentage change) or absolute difference. If an external radiation source is detected, an error status is signaled, as this is valuable information about the calibration status of the environment surrounding PET scanner 100. In particular, the presence of an external radiation source outside the field of view can be detrimental to image consistency and can introduce error into conclusions that are based on resulting PET images.

In some embodiments, after a full setup (block 210) and a baseline data acquisition, at a predetermined time interval various checks are performed, including several of the checks described above, e.g., based on position profile, energy spectra, random event sensitivity map, and/or time alignment. If any of the checks fail, then an error status is signaled. Thus, the calibration checking methodology may be configured in a serial processing format.

It is understood by those familiar with the art that techniques described herein may be implemented in hardware, firmware, or software encoded (e.g., as instructions executable by a processor) on a non-transitory computer-readable storage medium.

The apparatuses and processes are not limited to the specific embodiments described herein. In addition, components of each apparatus and each process can be practiced independent and separate from other components and processes described herein.

The previous description of embodiments is provided to enable any person skilled in the art to practice the disclosure. The various modifications to these embodiments will be readily apparent to those skilled in the art, and the generic principles defined herein may be applied to other embodiments without the use of inventive faculty. The present disclosure is not intended to be limited to the embodiments shown herein, but is to be accorded the widest scope consistent with the principles and novel features disclosed herein.

What is claimed is:

1. A method for operating a positron emission tomography (PET) scanner, the method comprising:
   balancing gain values of a plurality of photomultiplier tubes of one or more detectors of the PET scanner based on detected radiation from a radioactive calibration source placed in a field of view of the PET scanner;
   performing a time alignment for a plurality of scintillator crystals of the detectors based on time-of-flight (TOF) computations based on gamma photons associated with the radioactive calibration source;
   acquiring baseline data using intrinsic background radiation of the plurality of scintillator crystals, without any object in the field of view;
   storing a first set of data, based on the baseline data, in a memory of the PET scanner;
   after the acquisition of the baseline data, acquiring test data using intrinsic background radiation of the plurality of scintillator crystals, without any object in the field of view; and
   automatically checking a calibration status of the PET scanner or of an environment surrounding the PET scanner based on a comparison between the stored first set of data and a second set of data, wherein the second set of data is based on the test data.

2. The method of claim 1, further comprising:
   generating, based on the test data, a position profile for a subset of the scintillator crystals; and detecting a plurality of peaks in the position profile;
wherein the second set of data includes data associated with the detected plurality of peaks.

3. The method of claim 2, further comprising:
responsive to a detection of fewer than N peaks, signaling an error status, wherein N is the number of scintillator crystals in the subset of the scintillator crystals.

4. The method of claim 2, further comprising:
retrieving the first set of data from the memory, wherein the first set of data includes peak location data based on the baseline data;
determining, from the generated position profile and the retrieved first set of data, whether the peaks in the position profile have drifted sufficiently to satisfy a predetermined drift condition; and
if the predetermined drift condition has not been satisfied, storing locations of the detected peaks in the memory.

5. The method of claim 2, further comprising balancing the gain values of the plurality of photomultiplier tubes based on locations of the detected peaks in the position profile.

6. The method of claim 2, further comprising identifying a failed photomultiplier tube based on the position profile.

7. The method of claim 2, further comprising identifying, based on the position profile, a failed detector among the one or more detectors.

8. The method of claim 1, further comprising:
generating, based on the test data, an energy spectrum for each scintillator crystal, wherein the second set of data includes data associated with the generated energy spectrum;
retrieving the first set of data from the memory, wherein the first set of data includes photopeak data for the scintillator crystals based on the baseline data;
detecting a photopeak in the generated energy spectrum for each scintillator crystal;
comparing a detected photopeak with a corresponding photopeak in the retrieved first set of data, to determine whether the detected photopeak has drifted sufficiently to satisfy a predetermined drift condition; and
if the predetermined drift condition has not been satisfied, storing the detected photopeak in the memory.

9. The method of claim 1, further comprising:
generating a random event sensitivity map for the scintillator crystals based on random detection events from the test data;
determining, based on the random event sensitivity map, whether any external radiation source is present outside the field of view; and
if an external radiation source is detected, signaling an error status.

10. The method of claim 1, further comprising:
identifying a first scintillator crystal and a second scintillator crystal among the plurality of scintillator crystals, wherein a beta emission originating from an intrinsic background radioactive decay is detected at the first scintillator crystal and a coincidental cascade gamma photon emission is detected at the second scintillator crystal without any object in the field of view;
calculating an expected TOF for the emitted gamma photon based on the identification of the first and second scintillator crystals;
measuring a TOF for the emitted gamma photon based on detection times at the first and second scintillator crystals;
computing a time difference between the expected TOF and the measured TOF; and
signaling an error status if the computed time difference is outside a predetermined range.

11. The method of claim 10, wherein said calculating the expected TOF includes accessing a look-up table in a memory of the PET scanner, the look-up table being indexed by the first and second scintillator crystals.

12. The method of claim 10, wherein said identifying first and second scintillator crystals is performed repeatedly over a time interval for a plurality of decays, said method further comprising:
calculating an expected TOF for each detected gamma photon;
measuring a TOF for each detected gamma photon;
computing a time difference between the expected TOF and the measured TOF for each detected gamma photon, to yield a plurality of time differences;
computing a histogram of the plurality of time differences;
retrieving the first set of data from the memory;
comparing a centroid of the histogram with a value from the retrieved first set of data, to determine whether a predetermined time misalignment condition is satisfied; and
if the predetermined time misalignment condition is satisfied, signaling an error status.

13. A positron emission tomography (PET) scanner system comprising:
a plurality of detectors comprising a plurality of lutetium-based scintillator crystals;
a machine-readable storage medium; and
a system controller connected to and in communication with said detectors, wherein the machine-readable storage medium is encoded with a computer program code such that, when the computer program code is executed by the system controller, the system controller performs operations comprising:
balancing gain values of a plurality of photomultiplier tubes of one or more detectors of the PET scanner based on detected radiation from a radioactive calibration source placed in a field of view of the PET scanner;
performing a time alignment for the plurality of scintillator crystals of the detectors based on time-of-flight (TOF) computations based on gamma photons associated with the radioactive calibration source;
acquiring baseline data using intrinsic background radiation of the plurality of scintillator crystals, without any object in the field of view;
storing a first set of data, based on the baseline data, in a memory of the PET scanner;
after the acquisition of the baseline data, acquiring test data using intrinsic background radiation of the plurality of scintillator crystals, without any object in the field of view; and
automatically checking a calibration status of the PET scanner or of an environment surrounding the PET scanner based on a comparison between the stored first set of data and a second set of data, wherein the second set of data is based on the test data.

14. The PET scanner system of claim 13, wherein when the computer program code is executed by the system controller, the system controller further performs operations comprising:
generating, based on the test data, a position profile for a subset of the scintillator crystals; and
detecting a plurality of peaks in the position profile;
wherein the second set of data includes data associated with the detected plurality of peaks.

15. The PET scanner system of claim 13, wherein when the computer program code is executed by the system controller, the system controller further performs operations comprising:

generating, based on the test data, an energy spectrum for each scintillator crystal, wherein the second set of data includes data associated with the generated energy spectrum;

retrieving the first set of data from the memory, wherein the first set of data includes photopeak data for the scintillator crystals based on the baseline data;

detecting a photopeak in the generated energy spectrum for each scintillator crystal;

comparing a detected photopeak with a corresponding photopeak in the retrieved first set of data, to determine whether the detected photopeak has drifted sufficiently to satisfy a predetermined drift condition; and if the predetermined drift condition has not been satisfied, storing the detected photopeak in the memory.

16. The PET scanner system of claim 13, wherein when the computer program code is executed by the system controller, the system controller further performs operations comprising:

generating a random event sensitivity map for the scintillator crystals based on random detection events from the test data;

determining, based on the random event sensitivity map, whether any external radiation source is present outside the field of view; and if an external radiation source is detected, signaling an error status.

17. The PET scanner system of claim 13, wherein when the computer program code is executed by the system controller, the system controller further performs operations comprising:

identifying a first scintillator crystal and a second scintillator crystal among the plurality of scintillator crystals, wherein a beta emission originating from an intrinsic background radioactive decay is detected at the first scintillator crystal and a coincidental cascade gamma photon emission is detected at the second scintillator crystal without any object in the field of view;

calculating an expected TOF for the emitted gamma photon based on the identification of the first and second scintillator crystals;

measuring a TOF for the emitted gamma photon based on detection times at the first and second scintillator crystals;

computing a time difference between the expected TOF and the measured TOF; and signaling an error status if the computed time difference is outside a predetermined range.

18. A machine-readable storage medium, tangibly embodying a program of instructions executable by a processor to cause the processor to perform operations comprising:

balancing gain values of a plurality of photomultiplier tubes of one or more detectors of the PET scanner based on detected radiation from a radioactive calibration source placed in a field of view of the PET scanner;

performing a time alignment for a plurality of scintillator crystals of the detectors based on time-of-flight (TOF) computations based on gamma photons associated with the radioactive calibration source;

acquiring baseline data using intrinsic background radiation of the plurality of scintillator crystals, without any object in the field of view;

storing a first set of data, based on the baseline data, in a memory of the PET scanner;

after the acquisition of the baseline data, acquiring test data using intrinsic background radiation of the plurality of scintillator crystals, without any object in the field of view; and automatically checking a calibration status of the PET scanner or of an environment surrounding the PET scanner based on a comparison between the stored first set of data and a second set of data, wherein the second set of data is based on the test data.

19. The storage medium of claim 18, wherein the instructions are further executable by a processor to cause the processor to perform operations comprising:

generating, based on the test data, a position profile for a subset of the scintillator crystals; and detecting a plurality of peaks in the position profile;

wherein the second set of data includes data associated with the detected plurality of peaks.

20. The storage medium of claim 18, wherein the instructions are further executable by a processor to cause the processor to perform operations comprising:

generating, based on the test data, an energy spectrum for each scintillator crystal, wherein the second set of data includes data associated with the generated energy spectrum;

retrieving the first set of data from the memory, wherein the first set of data includes photopeak data for the scintillator crystals based on the baseline data;

detecting a photopeak in the generated energy spectrum for each scintillator crystal;

comparing a detected photopeak with a corresponding photopeak in the retrieved first set of data, to determine whether the detected photopeak has drifted sufficiently to satisfy a predetermined drift condition; and if the predetermined drift condition has not been satisfied, storing the detected photopeak in the memory.

21. The storage medium of claim 18, wherein the instructions are further executable by a processor to cause the processor to perform operations comprising:

generating a random event sensitivity map for the scintillator crystals based on random detection events from the test data;

determining, based on the random event sensitivity map, whether any external radiation source is present outside the field of view; and if an external radiation source is detected, signaling an error status.

22. The storage medium of claim 18, wherein the instructions are further executable to cause the processor to perform operations comprising:

identifying a first scintillator crystal and a second scintillator crystal among the plurality of scintillator crystals, wherein a beta emission originating from an intrinsic background radioactive decay is detected at the first scintillator crystal and a coincidental cascade gamma photon emission is detected at the second scintillator crystal without any object in the field of view;

calculating an expected TOF for the emitted gamma photon based on the identification of the first and second scintillator crystals;

measuring a TOF for the emitted gamma photon based on detection times at the first and second scintillator crystals;

computing a time difference between the expected TOF and the measured TOF; and signaling an error status if the computed time difference is outside a predetermined range.

* * * * *